W. J. HATTON.
PIPE FLANGING MACHINE.
APPLICATION FILED MAR. 4, 1914.
1,101,434.
Patented June 23, 1914.
2 SHEETS—SHEET 1.
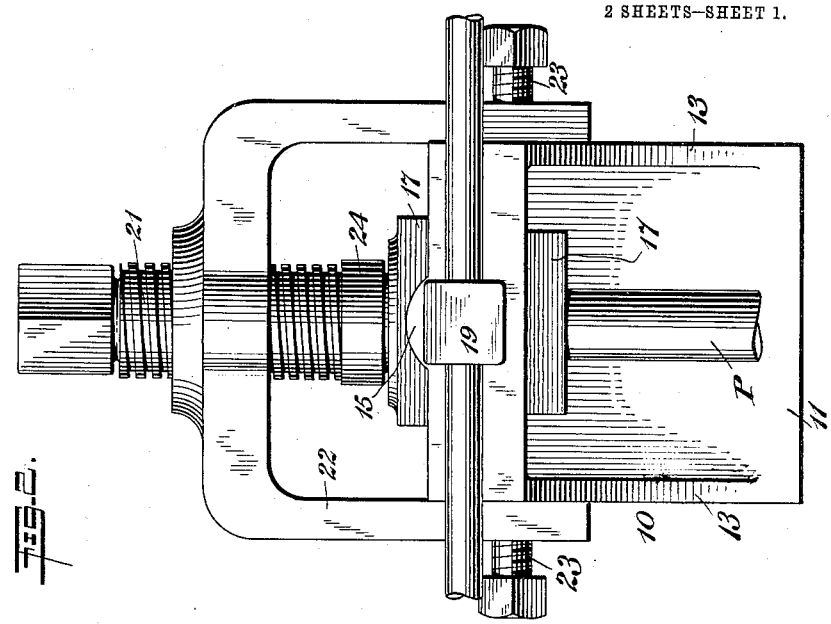
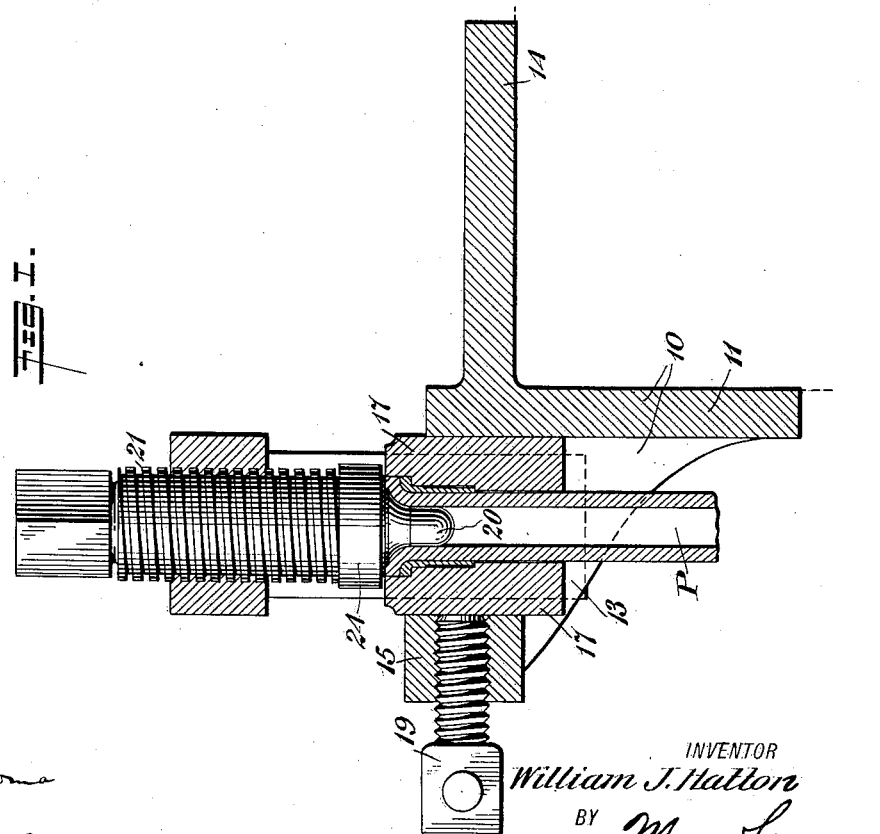
WITNESSES
G. Robert Thoma
Geo. L. Beeler
INVENTOR
William J. Hatton
BY
Munn & Co
ATTORNEYS

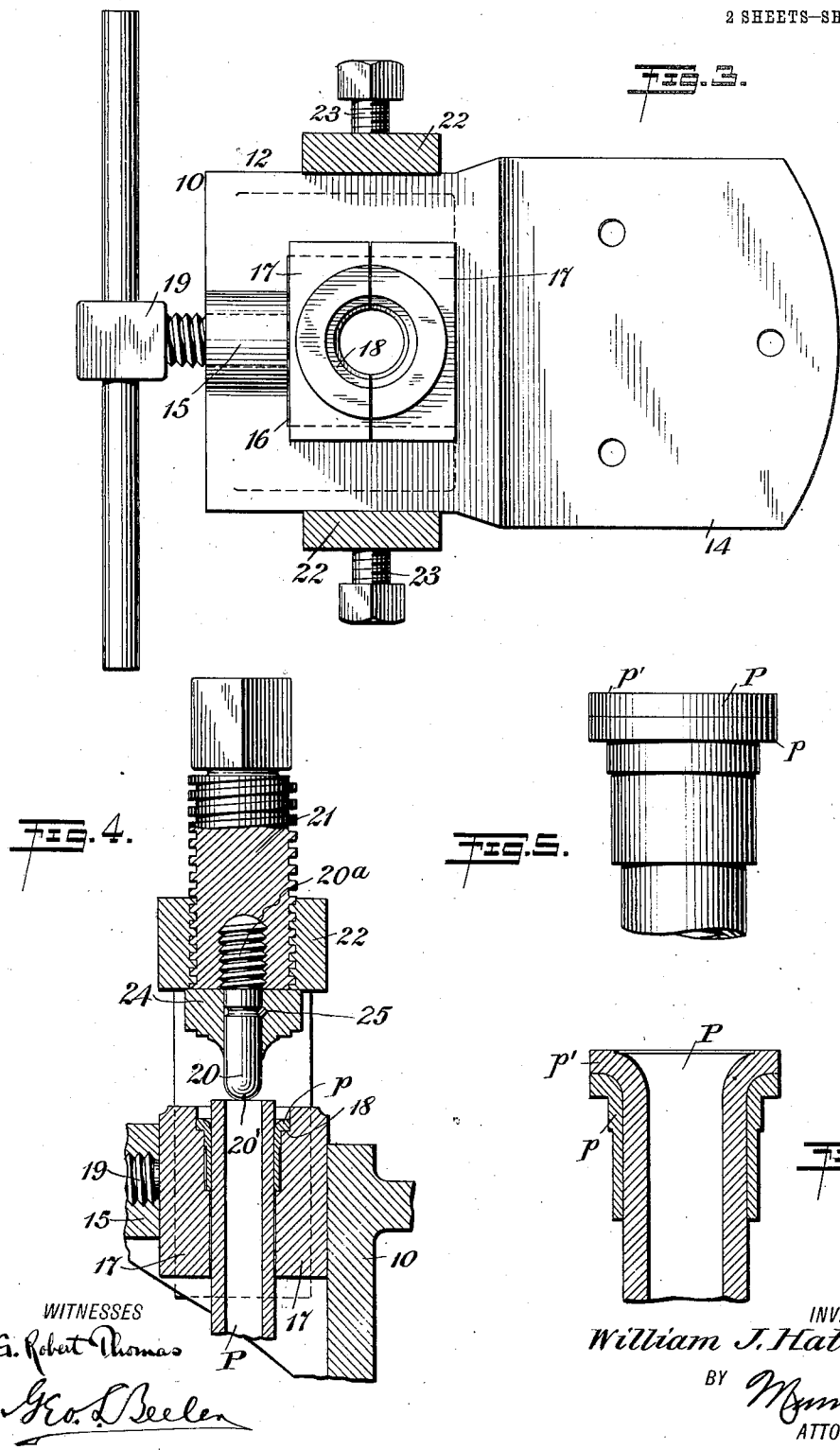

UNITED STATES PATENT OFFICE.

WILLIAM JOHN HATTON, OF ESCANABA, MICHIGAN.

PIPE-FLANGING MACHINE.

1,101,434.  Specification of Letters Patent.  Patented June 23, 1914.

Application filed March 4, 1914.  Serial No. 822,322.

*To all whom it may concern:*

Be it known that I, WILLIAM J. HATTON, a citizen of the United States, and a resident of Escanaba, in the county of Delta and State of Michigan, have invented a new and Improved Pipe-Flanging Machine, of which the following is a full, clear, and exact description.

This invention relates to plumbing apparatus and has particular reference to means or devices for flanging lead pipes.

More specifically stated, one of the objects of the invention is to provide improved means for rapidly and reliably forming the ends of lead pipes with flanges in connection with bushings or collars whereby such pipes may be connected to each other by any suitable coupling means acting through said collars and whereby the usual wiped joints may be avoided.

The foregoing and other objects of the invention will hereinafter be more fully described and claimed and illustrated in the drawings forming a part of this specification in which like characters of reference indicate corresponding parts in all the views, and in which—

Figure 1 is a vertical sectional view of my improvement showing its operation upon a lead pipe; Fig. 2 is a front elevation of the same; Fig. 3 is a top view of the anvil portion with the saddle in transverse section; Fig. 4 is a view somewhat similar to Fig. 1 but with the parts in different positions; and Figs. 5 and 6 are respectively an elevation and a vertical section of a lead pipe formed by the use of this machine.

The several parts of this device may be made of any suitable materials, and the relative sizes and proportions, as well as the general design of the mechanism, may be varied to a considerable extent without departing from the spirit of the invention hereinafter more fully described and specifically claimed.

At 10 I show a bracket of any suitable construction including a vertical back 11 and a horizontal plate 12 at right angles to the back 11 and braced by substantially triangular webs 13. I also provide an anchor plate 14 whereby the device may be secured to a bench or other suitable support. At the front portion of the plate 12 I provide a screw threaded hub 15.

A substantially rectangular opening 16 is formed vertically in or through the plate 12 just in the rear of the hub 15 and arranged therein are the two members 17 of the clamping construction providing a seat 18 for the end of a pipe P to be formed or flanged and the collar $p$ coöperating therewith. A screw 19 threaded in the hub 15 is adapted to bear against the outermost member 17 causing it to grip the pipe and collar in connection with the other member 17.

In the first steps of the process of forming the flange $p'$ upon the pipe, the end of the pipe is introduced through the collar $p$ which is of some suitable strong rigid metal and the pipe is then introduced into the vise or clamp constituted by the members 17 and the screw 19, and if desired, any suitable form of tool may be provided to spread the end of the pipe slightly. Subsequently I introduce into the end of the pipe a centering pin 20 having a rounded point 20'. Said pin is connected in any suitable manner as by screw threads $20^a$ to the end of a power screw 21 adapted to operate coaxially of the pipe P in a saddle or yoke 22. As shown in Fig. 2, the yoke 22 embraces the two sides of the bracket 10 and is detachably connected thereto by pivots 23 extending through the legs of the yoke in the bracket. After the pipe is set and started, as above described, the yoke 22 with its screw 21 is brought into position in alinement with the pipe and the screw is then rotated by a wrench or lever (not shown), whereby the screw is caused to project the centering pin downwardly into the pipe, as shown in Fig. 1, and bringing the mandrel or head 24 of the screw forcibly against the upper end of the pipe, finishing the operation and forming a flat face on the flange $p'$ adapted to be connected directly to the corresponding face of the next pipe section or a nipple of any suitable character to be connected to the pipe in a well known manner. The screw 21 may then be rotated in the reverse direction to withdraw the centering pin 20 from the pipe and the pipe may then be removed from the vise ready for another operation. The vise members 17 are adapted to be slipped into or out of the opening 16 and hence they may be of various sizes according to the several sizes of pipes which may be treated, and likewise the centering pin 20 and other parts may be interchanged for different sizes and a similar purpose. The mandrel or fuller head 24 is held in place on the centering pin by means of a small transverse pin or key 25, and after the head engages the pipe it will be held thereby from rotation.

Having thus described my invention, I claim as new and desire to secure by Letters Patent:—

1. In a pipe flanging machine, the combination of a bracket having a vertical opening therethrough, a pair of clamping members seated in said opening and adapted to support a pipe to be treated, means to cause said clamping members to grip the pipe to hold it in position, a yoke embracing the bracket and extending across the same above the clamping members, a screw operating in said yoke in longitudinal alinement with said pipe, a centering pin fixed in the end of the screw, and a fuller head journaled on the pin adjacent the end of the screw, substantially as and for the purposes set forth.

2. In a device of the character set forth, the combination of a bracket, a pair of clamping members seated therein, means coöperating with the bracket to force the clamping members toward each other to grip and hold a pipe in position, a yoke embracing the bracket, a power screw movable in said yoke in alinement with the pipe, and a centering pin projecting from the end of the screw into the end of the pipe, said screw having associated therewith a head coöperating with the end of the pipe and forming thereon a flat face flange, substantially as set forth.

In testimony whereof I have signed my name to this specification in the presence of two subscribing witnesses.

WILLIAM JOHN HATTON.

Witnesses:
 RAY ARTHUR MULVANEY,
 HELEN ARNOLD.